E. J. ROOD.
ANIMAL FEEDING DEVICE.
APPLICATION FILED SEPT. 10, 1917.
1,260,713.
Patented Mar. 26, 1918.
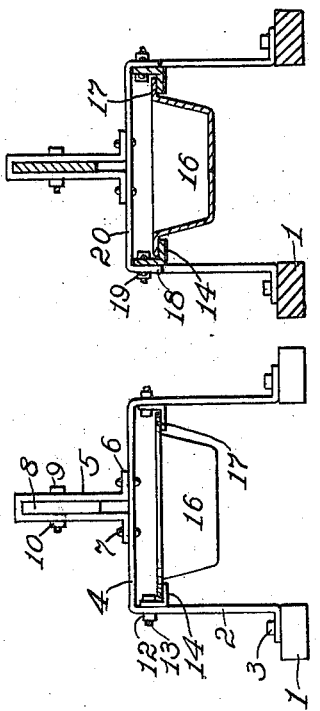
Inventor,
Edward J. Rood, by
G.C.Kennedy
Attorney.

UNITED STATES PATENT OFFICE.

EDWARD J. ROOD, OF WEBSTER CITY, IOWA.

ANIMAL-FEEDING DEVICE.

1,260,713.  Specification of Letters Patent.  Patented Mar. 26, 1918.

Application filed September 10, 1917. Serial No. 190,667.

*To all whom it may concern:*

Be it known that I, EDWARD J. ROOD, a citizen of the United States of America, and a resident of Webster City, Hamilton county, Iowa, have invented certain new and useful Improvements in Animal-Feeding Devices, of which the following is a specification.

My invention relates to improvements in animal feeding devices, and the object of my improvement is to furnish such a device with a removable feeding trough, with divisional contrivances and other means for permitting a number of animals to feed from said trough without interference, the trough, divisional contrivances and other means being mounted for adjustments relative to their supports, to suit them for use by animals differing in size.

This object I have accomplished by the means which are hereinafter described and claimed, and which are illustrated in the accompanying drawings, in which Figure 1 is a side elevation of one of my improved animal feeding devices, with dotted lines indicating different adjusted positions of the removable feeding trough, and of the longitudinal beam supported above the trough; Fig. 2 is an end elevation of the device, and Fig. 3 is a cross section of the device taken on the broken line 3—3 of said Fig. 1.

Similar numerals of reference denote corresponding parts throughout the several views.

My improved animal feeding device, while primarily intended for use by hogs, may be equally well adapted for other animals.

It comprises a removable trough mounted on a supporting-frame, the latter having divisional contrivances to keep the animals apart while feeding. The supporting-frame is composed of a plurality of pairs of cross-connected standards, each pair in the form of an inverted U, whose side members 2 are vertical, whose cross-connections 4 are horizontal, and whose side-members 2 have outwardly-directed extremities secured fixedly by means of bolts 3 to longitudinal beams 1, or to any other suitable base.

Immediately below the cross-connections 4, longitudinal angle-bars 14 are mounted for vertical adjustment on the inner opposed faces of the standards 2. The standards 2 have each vertically spaced bolt-holes 15, and bolts 13 passed through registering holes in the angle-bars and said holes 15, and secured by nuts 12, serve to maintain the angle-bars in a desired position of vertical adjustment on the standards. The numeral 16 denotes a trough provided with longitudinal edge flanges 17, the latter supported slidably upon the horizontally disposed parts of said angle-bars, whereby the trough may be removed from said supports by sliding it endwise along the angle-bars. Since the angle-bars may be adjusted vertically on said standards by the means just described, the trough may be raised or lowered in position, as indicated by the dotted lines in said Fig. 1, to render it accessible to animals of different sizes, so that they may more conveniently feed therefrom. To prevent such animals from trespassing upon one another, I have provided the horizontal cross-bars 20 disposed at intervals across and above the trough between said pairs of standards, the extremities of the cross-bars being turned down at 18 and riveted at 19 to the vertical components of said angle-bars 14. I have supplied other means for preventing animals from getting into the trough or interfering with other animals on the opposite side of the trough. This consists in the inverted U-shaped supports 5, whose extremities 6 are bent outwardly and secured by rivets 7 to the middle parts of said cross-connections 4 of the standards 2. A longitudinal board or beam 8 is positioned within the interspaces of the supports 5, secured thereto for vertical adjustment by means of bolts 9 passed through certain registering orifices 11 in the supports 5 and other orifices in the board, and secured by nuts 10. The vertical adjustment of said board or beam 8 is indicated by both the full and dotted lines in said Fig. 1, and said adjustment adapts the beam for use with different sizes of animals, for instance, it can be elevated to the position shown in the full lines, making it more of a barrier for larger animals.

The above adjustable features, it will be apparent, adapt the device for use by large or small hogs or pigs, and with a minimum of parts of most simple and inexpensive construction.

Having described my invention, what I claim as new, and desire to secure by Letters Patent, is:

1. In a device of the character described, a supporting frame composed of pairs of rigid standards, angle-bars fixed on the inner faces of said standards, a trough having lateral flanges supported between said standards on said angle-bars for longitudinal sliding thereon, and horizontal cross-bars positioned at intervals over said trough with their extremities secured to said angle-bars.

2. In a device of the character described, a supporting frame composed of pairs of rigid standards, angle-bars mounted for vertical adjustment on the inner faces of said standards, a trough having lateral flanges supported between said standards on said angle-bars for longitudinal displacement therealong, and cross-bars supported at intervals on said angle-bars above said trough.

3. In a device of the character described, a frame comprising pairs of transversely spaced standards having at their upper ends integral horizontal cross-connections, supporting-means mounted on said standards and vertically adjustable thereon, a trough supported longitudinally slidably on said supporting-means between the standards, vertical supports fixed on the middles of the horizontal cross-connections of said standards, and a longitudinal beam vertically adjustably mounted on said supports.

Signed at Webster City, Iowa, this 25th day of August, 1917.

EDWARD J. ROOD.

Witnesses:
W. BLANKENBUEHLER,
W. B. ROOD.

Copies of this patent may be obtained for five cents each, by addressing the "Commissioner of Patents, Washington, D. C."